(12) United States Patent
Riemann et al.

(10) Patent No.: US 7,860,890 B2
(45) Date of Patent: Dec. 28, 2010

(54) SYSTEM AND METHOD FOR PROVIDING ACCESS TO AN APPLICATION THROUGH A COMMON INTERFACE FOR APPLICATION EXTENSIONS

(75) Inventors: Steffen Riemann, St. Leon-Rot (DE); Uwe Freising, Frankenthal (DE)

(73) Assignee: SAP AG, Walldorf (DE)

( * ) Notice: Subject to any disclaimer, the term of this patent is extended or adjusted under 35 U.S.C. 154(b) by 383 days.

(21) Appl. No.: 11/959,572

(22) Filed: Dec. 19, 2007

(65) Prior Publication Data

US 2008/0098036 A1 Apr. 24, 2008

Related U.S. Application Data

(62) Division of application No. 10/953,772, filed on Sep. 30, 2004, now abandoned.

(51) Int. Cl.
*G06F 7/00* (2006.01)
(52) U.S. Cl. .................. 707/790; 707/610; 707/792
(58) Field of Classification Search ........................ None
See application file for complete search history.

(56) References Cited

U.S. PATENT DOCUMENTS 6,658,625 B1 * 12/2003 Allen ..................... 715/236
7,213,235 B2 * 5/2007 Ziv ........................ 717/135
7,367,029 B2 * 4/2008 Edwards et al. ............. 719/315
2004/0068728 A1 * 4/2004 Blevins ...................... 718/100
2004/0221261 A1 * 11/2004 Blevins ...................... 717/107
2005/0097574 A1 * 5/2005 Morrison et al. ............ 719/328
2005/0251809 A1 * 11/2005 Gunduc et al. .............. 719/310

* cited by examiner

*Primary Examiner*—Charles Kim
*Assistant Examiner*—Jessica N Le
(74) *Attorney, Agent, or Firm*—Kenyon & Kenyon LLP (57) ABSTRACT

A method and system to permit externally created business objects to access a business management application database without using direct database language statements. An add-on framework includes an add-on extension manager to start an add-on application, register a form from the add-on application, and receive and route an event from the business management application to the add-on application through a user interface application programming interface component object model interface. A persistency layer provides a set of programming language classes and interface definitions to develop a persistent business object in the add-on extension, and connect the persistent business object to a database through a data interface application programming interface component object model interface to read and write data from the database associated with the business management application.

5 Claims, 9 Drawing Sheets

SYSTEM AND METHOD FOR PROVIDING ACCESS TO AN APPLICATION THROUGH A COMMON INTERFACE FOR APPLICATION EXTENSIONS

CROSS REFERENCE TO RELATED APPLICATIONS

This application claims the benefit of and priority to U.S. application Ser. No. 10/953,772 filed Sep. 30, 2004, which is hereby incorporated by reference in its' entirety.

FIELD OF THE INVENTION

The invention relates to software applications for and, in particular, to methods and systems to permit business objects to read data from and write data to a business management application database without using direct database language statements.

BACKGROUND

It is common that organizations using commercial off-the-shelf business management software applications (accounting, logistics, and customer relationship management software) need to extend the software to meet their specific requirements. For example, the organizations may need to permit add-on applications (i.e., extensions) to read data from and write data to a database associated with the business management software. Unfortunately, this usually requires creating individual programs using database language statements, for example, structured query language ("SQL") statements, for each add-on business application. In addition to each add-on application needing code specific to the particular add-on, the code must also be tailored for the specific type database that it is trying to access. Typically, current business management software applications do not directly provide a simple and uniform access mechanism for add-on business applications to access the databases associated with the business management software applications.

There is a need for a method and system to permit business objects to read data from and write data to the business management application database without using database language statements and to have a business object layer communicate with a persistence layer via a well-defined interface.

DETAILED DESCRIPTION

As described herein, exemplary embodiments of the present invention include a business management software application add-on framework that provides a generalized method/mechanism to permit add-on business applications, for example, user and/or third-party add-on applications, to read data from and write data to a database associated with the business management software without requiring the add-on business application to use structured query language ("SQL") statements. The add-on framework may be connected to, and permit an add-on business application to communicate with, the business management software application through a user interface ("UI") application programming interface ("API") and a data interface ("DI") API. The add-on business application may have a persistent business object to communicate with a persistency layer via a well-defined interface.

In accordance with some embodiments of the present invention, the persistency layer may provide a single, unified interface for all application(s) designed as an add-on to the business management software application to access the main data base management system without having to use SQL statements. The persistency layer may simplify the implementation of persistent business objects, since the persistency layer may not only generate SQL statements, it may also handle the conversion of data according to the corresponding data type. For example, a date can be treated in different ways depending on which database management system ("DBMS") is used. The persistency layer may also ensure the security of the add-on application by preventing backward contamination of the add-on application's data, since there may exist situations in which a SQL injection could contaminate the data in the add-on application. SQL injection is a technique in which an attacker passes a SQL string input to an application in an attempt to manipulate the SQL statement to change or damage the data in the business management software application's database. The backward contamination of the add-on application may occur when data returned from the main database in response to the user's SQL query is already contaminated by a SQL injection and likewise contaminates the add-on application.

In addition, in accordance with some embodiments of the present invention, the persistency layer may permit add-on applications to use different DBMS transparently. As a result, a user may switch between the different DBMS, such as, for example, Microsoft SQL and DB/2, without having to change the source code in the add-on application, since requests from the add-on application are all formatted the same to communicate with the persistency layer, which automatically translates each request into the proper format to access the desire DBMS. The functionality of the persistency layer may be specifically designed to be used with the add-on framework. This means that the persistency layer may cover special requirements that are typical for the business management software, for example, the management of business object collections and data browsing through such a collection.

The following definitions are provided for selected acronyms and phrases that are used herein.

"Add-on framework" refers to an infrastructure (for example, a set of C++ class templates and utility functions) to develop and run add-on applications with functional extensions for a software application, such as a business management software application.

"Add-on" refers to a software component started by the software application, which enables functional extensions.

"UI server" refers to a user interface component object model ("COM") server for a software application.

"GUID" refers to a globally unique identifier that is used to identifying COM entities, for example, interfaces, libraries, objects, etc.

Figure 1:
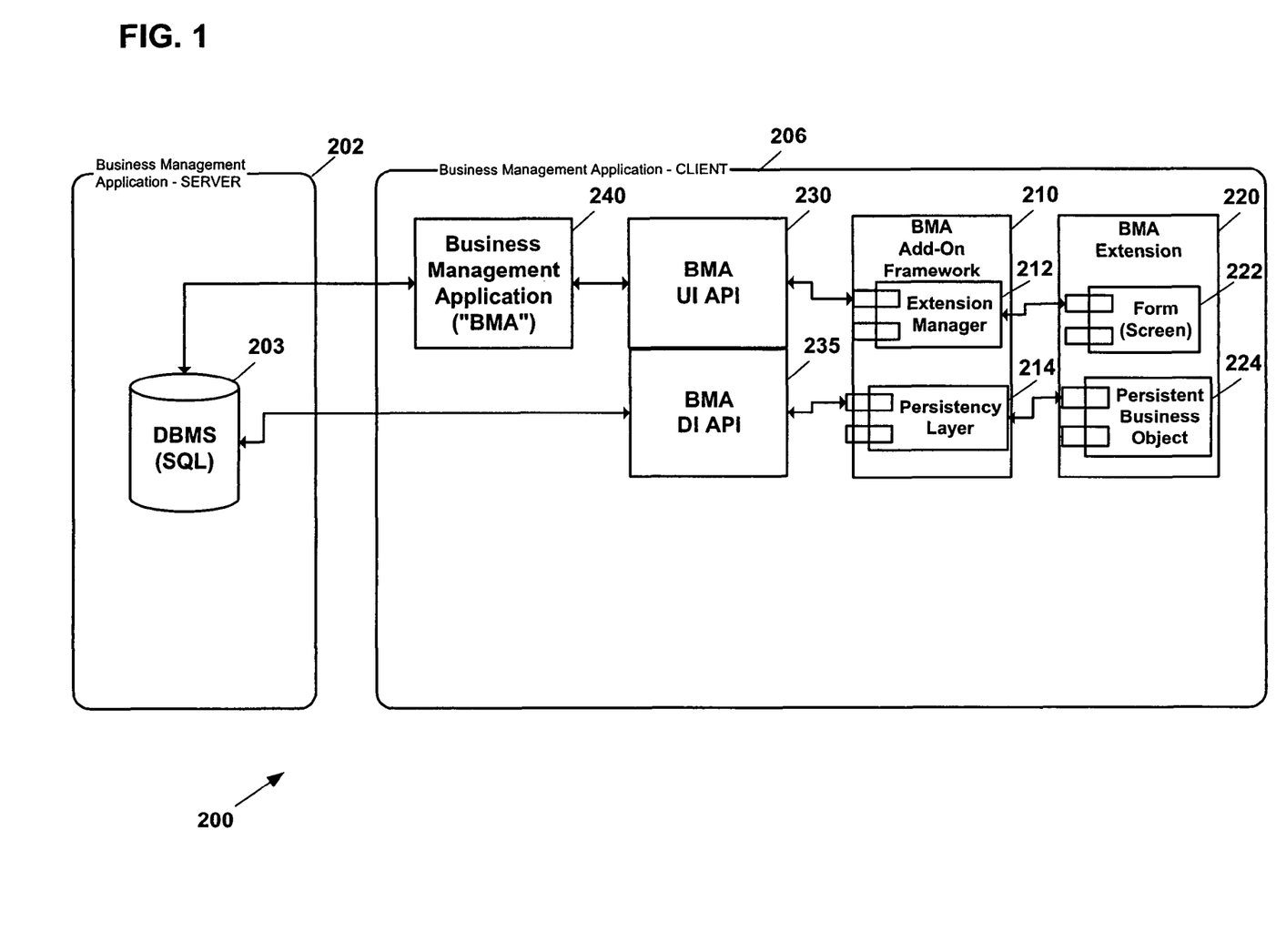
FIG. 1 is a block diagram of a computer system incorporating a functional data interface ("DI") application programming interface ("API") and a functional user interface ("UI") API, both of which may communicate with component object model ("COM") objects to interface an add-on application to a business management software application database through an add-on framework, in accordance with an embodiment of the present invention.

FIG. 1 is a block diagram of a computer system incorporating a functional DI API and a functional UI API, both of which may communicate with COM objects to interface an add-on application to a business management software application database through an add-on framework, in accordance with an embodiment of the present invention. In FIG. 1, a computer system 200 may include a business management software application server 202 that may be in communication with a business management software application client 206. In FIG. 1, business management software application server 202 may include a DBMS 203. Business management software application client 206 may include an add-on framework 210, which may be connected to an add-on application 220, a UI API 230, and a DI API 235. UI API 230 may be connected to a business management software application 240 and DI API 235 may be in communication with DBMS 203. Business management software application 240 may also be in communication with DBMS 203.

Add-on framework 210 may be used to develop add-on application 220 to access business management software application 240 and DBMS 203. Add-on framework 210 may be used to define a proven design pattern that is to be followed by add-on application 220, as well as, all other add-on application's, and to provide a simplified interface to business management software application 240. Add-on framework 210 may also include some minor components like logging/tracing and common data types, which are not shown for ease of illustration.

Add-on framework 210 may include an extension manager 212 and a persistency layer 214. Extension Manager 212 may enable simplified processing of events that have been started in UI API 230, for example, a COM interface. In addition, extension manager 212 may be connected to a set of, for example, classes (e.g., C++ classes) that may be used when a developer implements add-on application 220 (also called an "extension"). Add-on application 220 may include one or more forms 222 (i.e., screens) and one or more persistent business objects 224. The template classes (e.g., C++ template classes) may enable add-on application 220 to handle general events such as "start of application", "end of application", etc. and for the implementation of one or more forms 222 (i.e., screens) within add-on application 210.

The persistency layer 214 may provide a set of classes that are to be used to implement persistent business object 224. Persistency Layer 214 may be the mechanism for addressing the underlying storage and provide a simple interface, generating SQL statements for received data and converting the data according to the data type required by the DBMS 203. A developer of extension 220 may implement persistent business object 224 through persistency layer 214 without the requiring the kind of DBMS 203 to be defined expressly for it and without using SQL statements. Persistency Layer 214 may connect persistent business object 224 to DBMS 203 using DI API COM interface 235.

In accordance with an embodiment of the present invention, in FIG. 1, add-on framework 210 may consist of two parts: add-on extension manager 212, and a set of classes and interface definitions for developing extensions. Add-on extension manager 212 may be implemented as a COM object, which may be started by business management software application 240 and may offer the following interfaces to:

register forms 222 through which extension 220 may receive events from business management software application 240;

store/provide extension specific data in DBMS 203;

write messages to a central log file; and provide state/progress information on initialization.

The main task of add-on extension manager 212, in FIG. 1, is to receive events from the business management software application 240 and dispatch the events to appropriate extensions 220. Of course, add-on extension manager 212 may also be responsible for starting all registered extensions 220. A "registered extension" is an extension that has been previously identified to, and saved by, the business management software application.

With the help of the framework classes and interface definitions, a skeleton for creating extension 220 may be provided. Extension 220 may run under control of add-on extension manager 212. Add-on extension manager 212 may also be implemented as a COM object, which may provide interfaces for handling events from business management software application 240 dispatched by add-on extension manager 212. For example, these events may include:

start/stop of software business object ("SBO");

form creation;

menu events; and

SBO administration events (change language, change company, etc.)

These events may be broadcast to all instances of add-on extension 220, while item events may be distributed only to extensions that have registered a form to receive events. In this case, the extension may provide an additional COM object to be passed to the add-on extension manager 212 in a form registration request. The object may offer particular interfaces for handling item events, handling menu events, and providing the add-on extension manager 212 with some form-specific data.

Further, add-on extension 220 may register standard business management forms as well as its own self-created forms. Before registering the standard form, add-on extension 220 may perform some modifications to it, for example, add a new button. For forms created by add-on extension 220, add-on framework 210 may offer support for loading forms from XML definition files.

Add-on extension manager 212 may be implemented as an API executable (e.g., a win32 executable), which may implement the COM object as a singleton object. This means that there may only be one COM object providing services to all extensions. The reasons for this may include:

Business management software application 240 may start add-on extension 220 by starting an executable. Creating a new instance of the add-on COM object with every start of business management software application 240 could result in several add-on processes running on the system.

There may only be one running business management software application business object UI server 202 to serve all running business management software applications.

To reduce the number of add-on processes and to be consistent with the behavior of the business management software application business object UI Server 202, add-on COM object may be implemented as a singleton. Consequently, the implementation of add-on extension manager 212 may be aware of existing instances already started. In general, the first instance is responsible for maintaining the add-on COM object and will, therefore, run as long as business management software application business object UI Server 202 is running. All subsequent instances just need to inform the first one that a new business management software application 240 has been started and terminate immediately after that. Add-on extension manager 212 may require extensions to be implemented as an API data link library ("dll").

Figure 2:
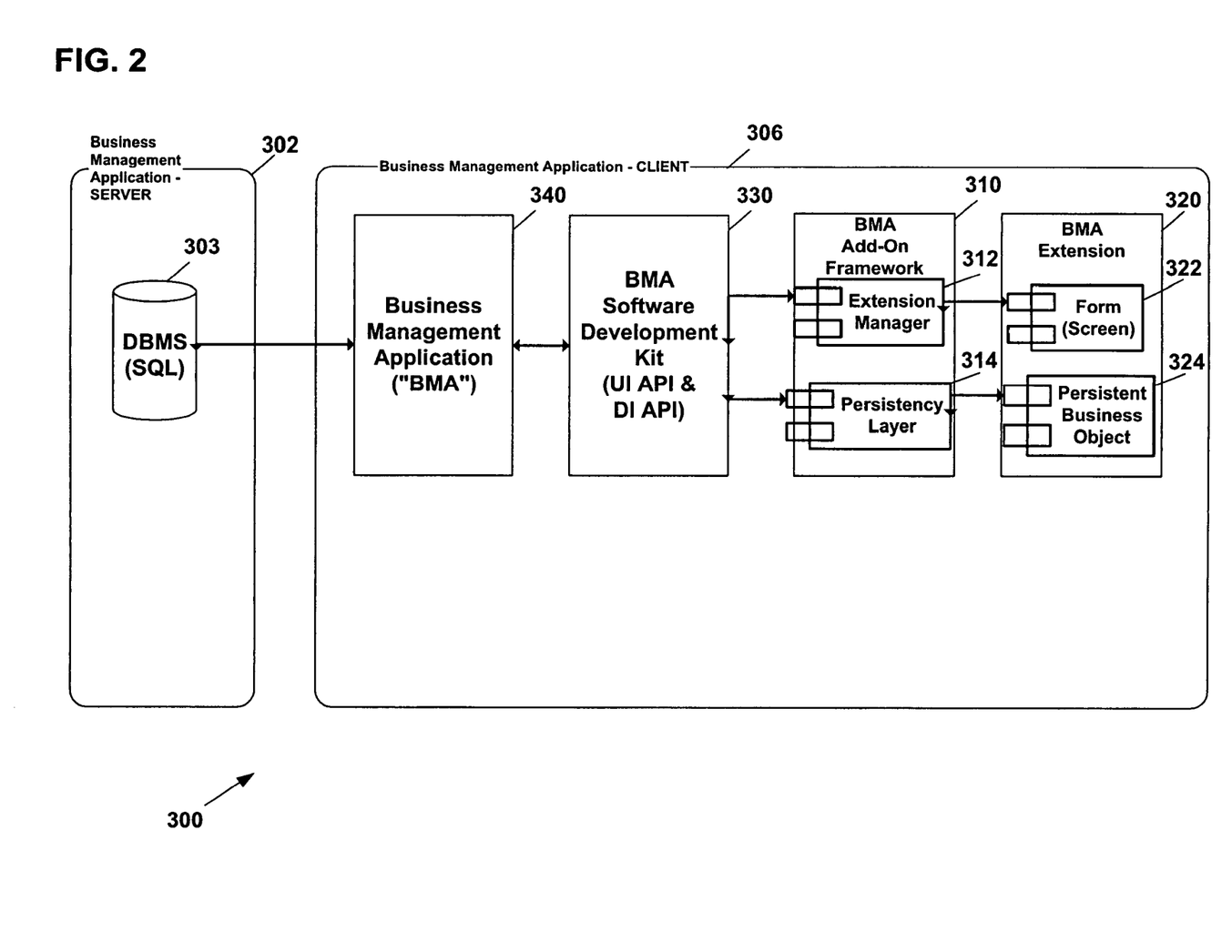
FIG. 2 is a block diagram of a computer system incorporating a software development kit including a functional DI API and a functional UI API, both of which may communicate with COM objects to interface an add-on application to a business management software application database through an add-on framework, in accordance with another embodiment of the present invention.

FIG. 2 is a block diagram of a computer system incorporating a software development kit including a functional DI API and a functional UI API, both of which may communicate with COM objects to interface an add-on application to a business management software application database through an add-on framework, in accordance with another embodiment of the present invention. In FIG. 2, a computer system 300 may include a business management software application server 302 that may be in communication with a business management software application client 306. In FIG. 2, business management software application server 302 may include a DBMS 303. Business management software application client 306 may include an add-on framework 310, which may be connected to an add-on application 320, a business management application software development kit ("SDK") 330 which may include an UI API and a DI API. SDK 330 may be connected to a business management software application 340, which in turn may be in communication with DBMS 303.

Add-on framework 310 may be used to develop an add-on application 320 to access business management software application 340 and DBMS 303. Add-on framework 310 may be used to define a proven design pattern that is to be followed by add-on application 320, as well as, all other add-on application's, and to provide a simplified interface to business management software application 340. Add-on framework 310 may also include some minor components like logging/tracing and common data types, which are not shown for ease of illustration.

Add-on framework 310 may include an extension manager 312 and a persistency layer 314. Extension Manager 312 may enable simplified processing of events that have been started in UI API 330, for example, a COM interface. In addition, extension manager 312 may be connected to a set of, for example, classes that may be used when a developer implements add-on application 320 (also called an "extension").

Add-on application 320 may include one or more forms 322 (i.e., screens) and a persistent business object 324. The template classes may enable add-on application 320 to handle general events such as "start of application" "end of application". etc. and for the implementation of one or more forms 322 (i.e., screens) within add-on application 320.

Persistency layer 314 may provide a set of classes that are to be used to implement persistent business object 324. Persistency Layer 314 may be the mechanism for addressing the underlying storage and provide a simple interface, generating SQL statements for received data and converting the data according to the data type required by the DBMS 203. A developer of extension 320 may implement persistent business object 324 through persistency layer 314 without the need to know what kind of DBMS 303 is actually in use and without using SQL statements. Persistency Layer 314 may conned persistent business object 324 to DBMS 303 using a DI API COM interface in SDK 330.

In accordance with an embodiment of the present invention, in FIG. 2, add-on framework 310 may consist of two parts: add-on extension manager 312, and a set of classes and interface definitions for developing extensions. Add-on extension manager 312 may be implemented as a COM object, which may be started by business management software application 340 and may offer the following interfaces to:

register forms 322 through which extension 320 may receive events from business management software application 340;

store/provide extension specific data in DBMS 303;

write messages to a central log file; and provide state/progress information on initialization.

In accordance with the present embodiment, the main task of add-on extension manager 312, in FIG. 2, is to receive events from business management software application and dispatch the events to appropriate extensions 320. Of course, add-on extension manager 312 may also be responsible for starting all registered extensions 320.

With the help of the framework classes and interface definitions, a skeleton for creating extension 320 may be provided. Extension 320 may run under control of add-on extension manager 312. Add-on extension manager 312 may also be implemented as a COM object, which may provide interfaces for handling events from business management software application 340 dispatched by add-on extension manager 312. For example, these events may include:

start/stop of SBO;

form creation;

menu events; and

SBO administration events (change language, change company, etc.)

These events may be broadcast to all instances of add-on extension 320, while item events may be distributed only to extensions that have registered a form to receive events. In this case, the extension may provide an additional COM object to be passed to the add-on extension manager 312 in a form registration request. The object may offer particular interfaces for handling item events, handling menu events, and providing the add-on extension manager 312 with some form-specific data.

Further, add-on extension 320 may register standard business management forms as well as its own self-created forms. Before registering the standard form, add-on extension 320 may perform some modifications to it, for example, add a new button. For forms created by add-on extension 320, add-on framework 310 may offer support for loading forms from XML definition files.

In the present embodiment, add-on extension manager 312 may be implemented as an API executable (e.g., a win32 executable), which may implement the COM object as a singleton object. This means that there may only be one COM object providing services to all extensions. The reasons for this may include:

Business management software application 340 may start add-on extension 320 by starting an executable. Creating a new instance of the add-on COM object with every start of business management software application 340 could result in several add-on processes running on the system.

There may only be one running business management software application business object UI server 302 to serve all running business management software applications.

To reduce the number of add-on processes and to be consistent with the behavior of the business management software application business object UI Server 302, add-on COM object may be implemented as a singleton. Consequently, the implementation of add-on extension manager 312 may be aware of existing instances already started. In general, the first instance is responsible for maintaining the add-on COM object and will, therefore, run as long as business management software application business object UI Server 302 is alive. All subsequent instances just need to inform the first one that a new business management software application 340 has been started and terminate immediately after that. Add-on extension manager 312 may require extensions to be implemented as an API data link library ("dll").

Figure 3:
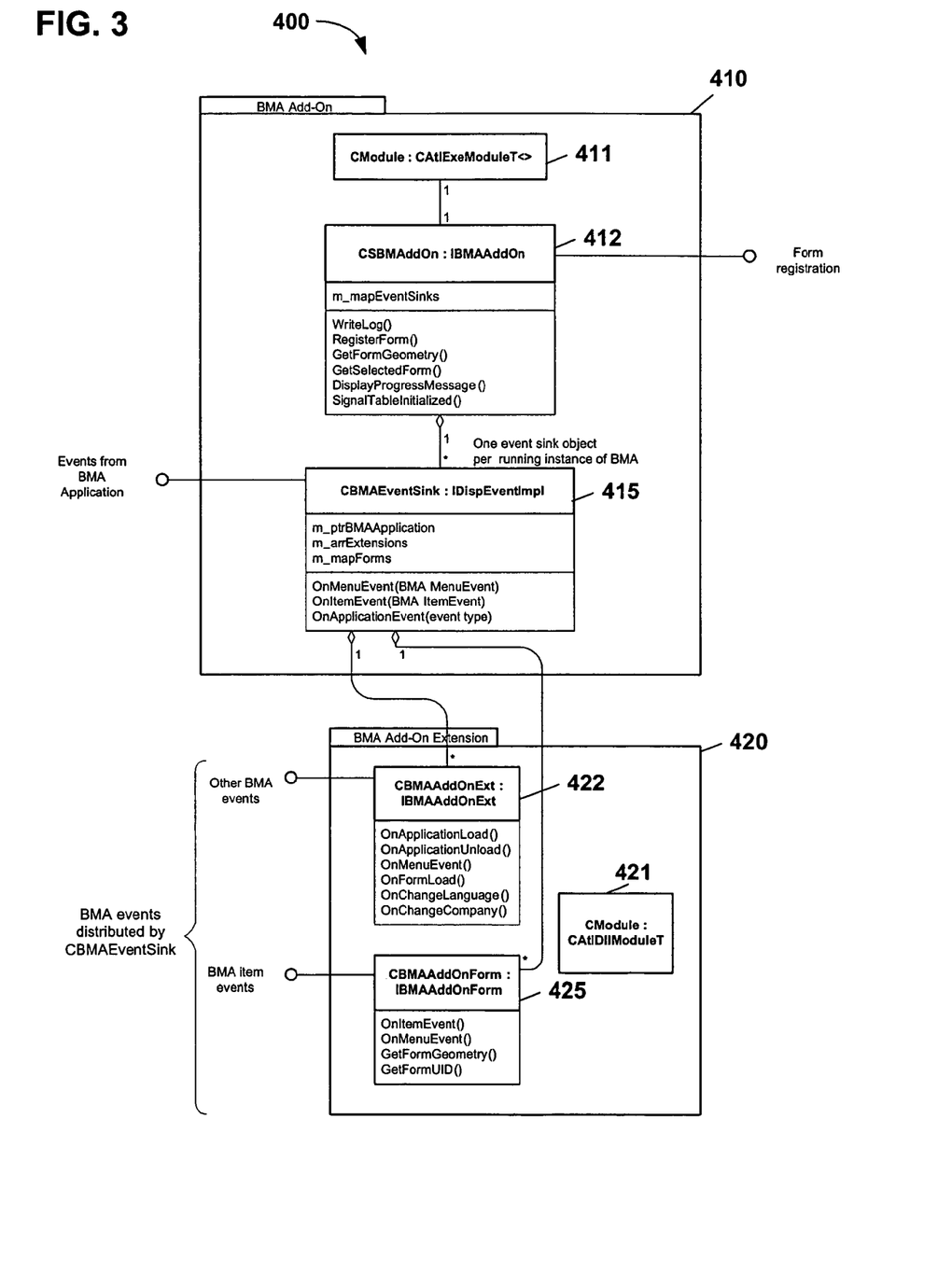
FIG. 3, is a class diagram illustrating a COM object structure for a business management add-on framework and an associated add-on extension, in accordance with an embodiment of the present invention.

FIG. 3, is a class diagram illustrating a COM object structure for a business management add-on framework and an associated add-on extension, in accordance with an embodiment of the present invention. In FIG. 3, a class diagram 400 for a business management application add-on extension manager, for example, add-on extension manager 212 from FIG. 1, may include a business management add-on framework 410 and an add-on extension 420. Business management add-on framework 410 may include a COM object executable module 411, which may be connected to an add-on COM object 412 and may receive events from a business management application. Business management add-on extension 420 may include a COM object dll module 421, an add-on extension COM object 422 that may be connected to event sink COM object 415 and an add-on form COM object 425 that may also be connected to event sink COM object 415.

Add-on COM object 412 may be connected to one or more event sink COM objects 415 in business management application add-on extension 420. In general, there will only be one instance of add-on COM object 412 for each business management application to provide interfaces for: form registration; storing/providing extension specific data; message logging; and providing state/progress information on initialization. In addition, add-on COM object 412 may maintain a map of event sink objects for every running business management application. The key in this map is the business management application ID. Every running business management application may have exactly one event sink COM object 415 to which it may deliver business management application events.

Event sink COM object 415 may provide interfaces for receiving: business management application menu events; item events; and application events. Event sink COM object 415 may maintain a list of extension objects and a map of registered forms objects. The key in this map may be a business management application form UID. Because more than one extension may register the same standard form, the map may contain several items with the same key. Add-on extension COM object 422 may provide interfaces to receive: start/stop of business management application events; form creation events; menu events; and business management application administration events (change language, change company, etc.). Add-on form COM object 425 may include interfaces to: receive business management application item and menu events; and provide form specific data.

The add-on extension manager may receive all events from business management application in event sink COM object 415. A subset of business management application events may be distributed to all extensions in add-on extension COM object 422. Remaining business management application events may be delivered directly to the add-on extension in add-on form COM object 425 (via a map of registered forms). Extension registers form and stores/retrieves form specific data to the add-on extension manager in add-on COM object 412. All extensions may send log messages to the add-on extension manager in add-on COM object 412. All extensions may send information about the progress of initialization to the add-on extension manager in add-on COM object 412.

Figure 4:
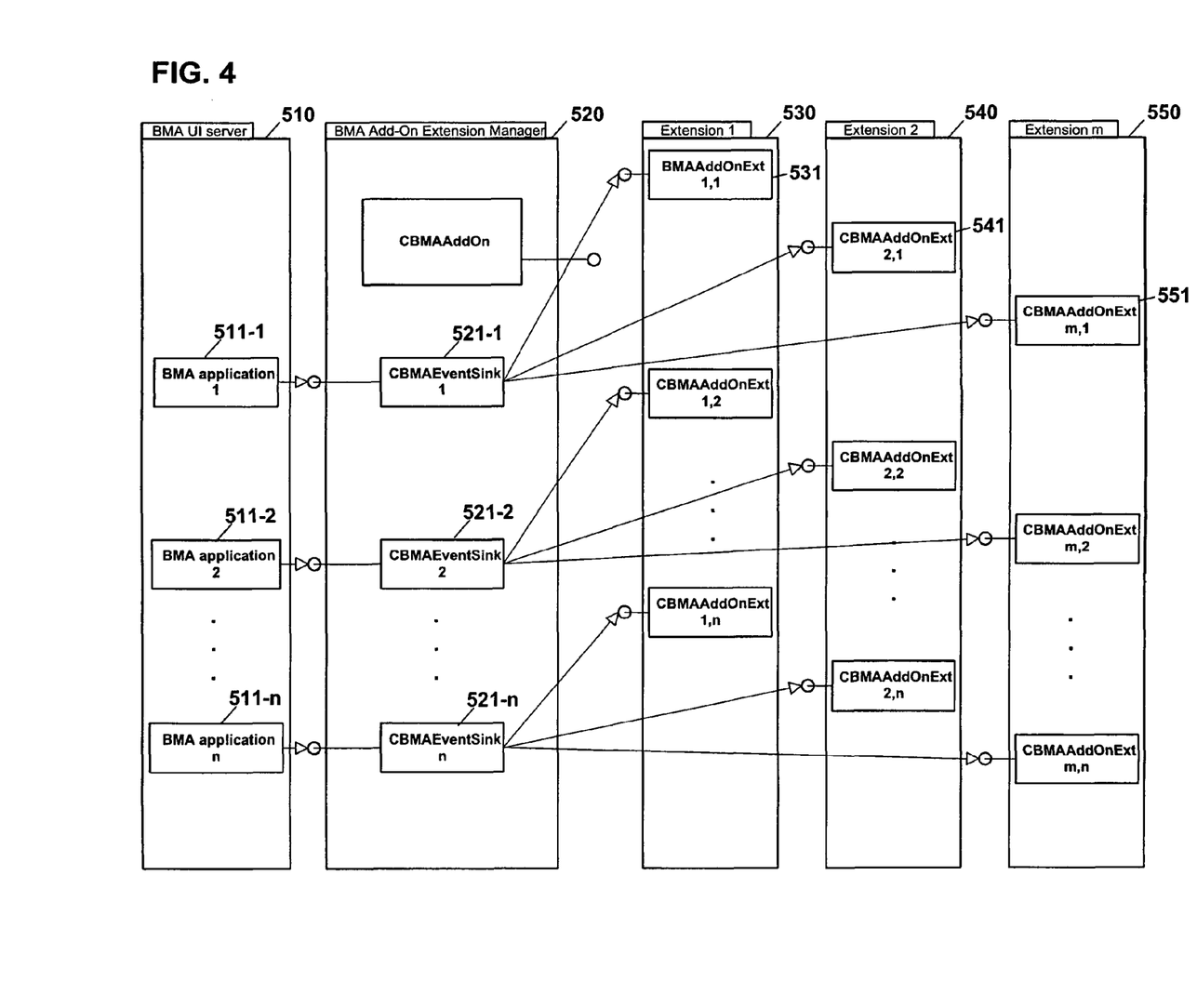
FIG. 4 is a block diagram start-up activity diagram showing the relationship between a business management application UI server, an add-on extension manager and one or more add-on extensions, in accordance with an embodiment of the present invention.

FIG. 4 is a block diagram start-up activity diagram showing the relationship between a business management application UI server 510, an add-on extension manager 520 and one or more add-on extensions, for example, a first add-on extension 530, a second add-on extension 540 and an m-th add-on extension 550, in accordance with an embodiment of the present invention. In FIG. 4, business management application UI server 510 may include one or more business management applications 511-1 to 511-$n$, which may each be connected to different event sink COM objects 521-1 to 521-$n$ in add-on extension manager 520. Each event sink COM object 521-1 to 521-$n$ may be connected to one add-on extension COM object in each of one or more add-on extensions 530, 540, 550. For example, event sink COM object 521-1 may be connected to a first add-on extension COM object 531, 541, 551 in each of one or more add-on extensions 530, 540, 550. Specifically, event sink COM object 521-1 may be connected to a first add-on extension COM object 531, 541, 551 in each of one or more add-on extensions 530, 540, 550. However, in general, although an event sink COM object may be connected to multiple add-on extension COM objects, each event sink COM object may only be associated with a single add-on extension COM object in each add-on extension.

Figure 5:
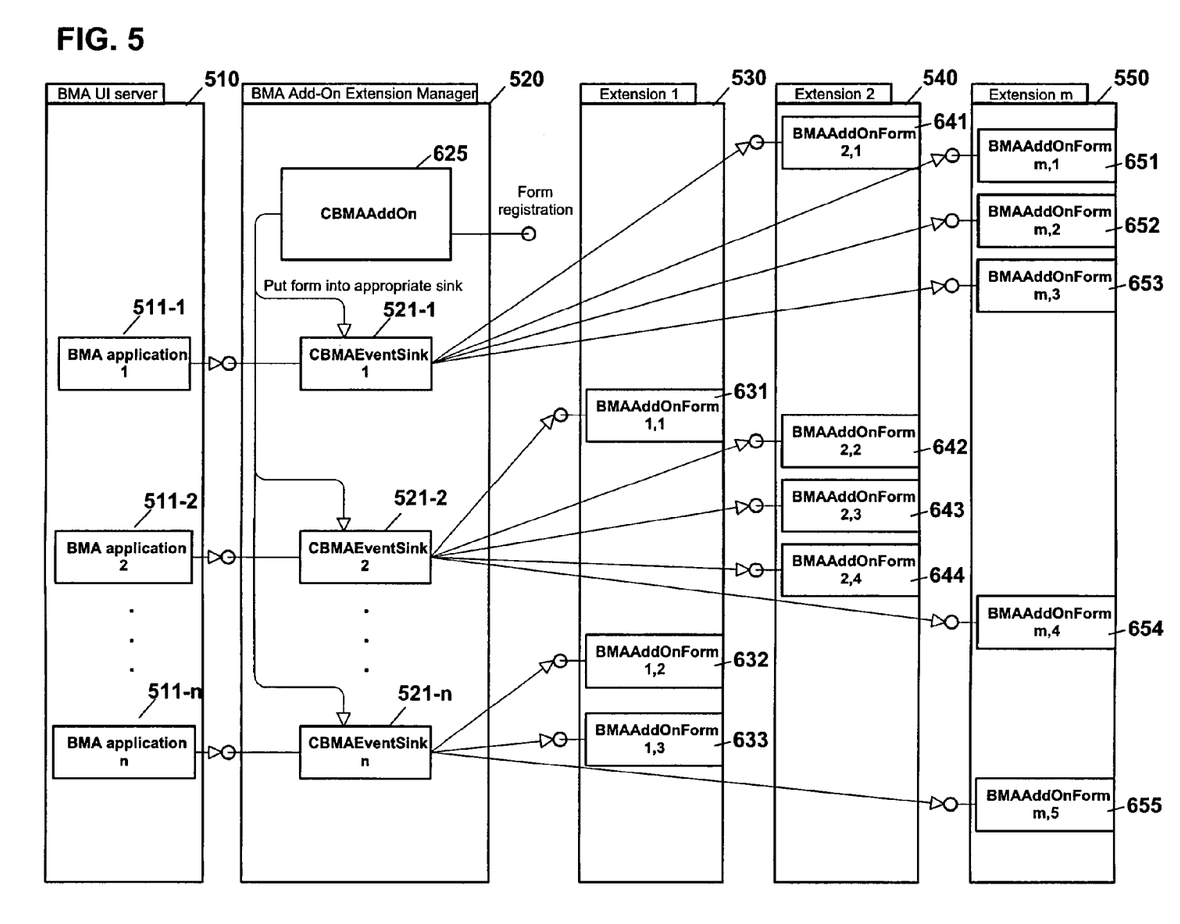
FIG. 5 is a block diagram start-up activity diagram showing the relationship between the event sink COM objects and one or more add-on form COM objects in the one or more add-on extensions of FIG. 4, in accordance with an embodiment of the present invention.

FIG. 5 is a block diagram start-up activity diagram showing the relationship between the event sink COM objects and one or more add-on form COM objects in the one or more add-on extensions of FIG. 4, in accordance with an embodiment of the present invention. In FIG. 5, one or more business management applications 511-1 to 511-$n$ may each be connected to different event sink COM objects 521-1 to 521-$n$ as in FIG. 4. However, unlike in FIG. 4, each event sink COM object 521-1 to 521-$n$ may be connected to zero or more add-on form COM objects in each of first, second and third add-on extensions 530, 540, 550, respectively. In general, each add-on form COM object may be connected (i.e., registered) through an add-on COM object 625 with the appropriate event sink COM object in add-on extension manager 520. For example, in FIG. 5, event sink COM object 521-1 may not be connected to any add-on form COM objects in first add-on extension 530; a first add-on form COM object 641 in second add-on extension 540; and to a first add-on form COM object 651, a second add-on form COM object 652, and a third add-on form COM object 653. Likewise, second event sink COM object 521-2 may be connected to a first add-on form COM object 631 in first add-on extension 530; a second add-on form COM object 642, a third add-on form COM object 643 and a fourth add-on form COM object 644 in second add-on extension 540; and a fourth add-on form COM object 654 in third extension 550. Similarly, third event sink COM object 521-*n* may be connected to a second add-on form COM object 632 and a third add-on COM object 633 in first add-on extension 530; to nothing in second add-on extension 540; and a fifth add-on form COM object 655 in third add-on extension 550.

Figure 6:
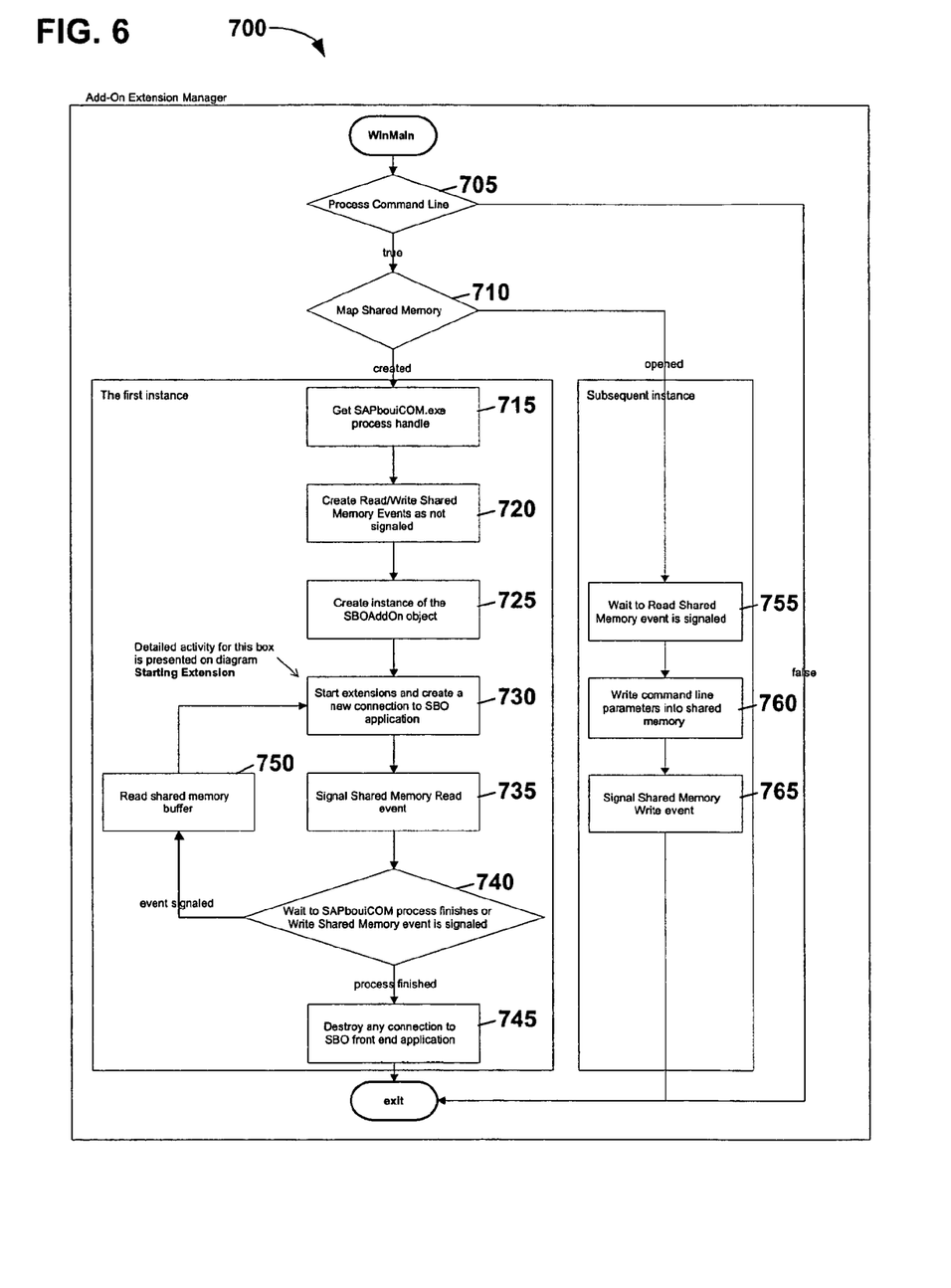
FIG. 6 is a flow diagram of a method showing the activities that may be involved in starting up an add-on extension application in an add-on extension manager, in accordance with an embodiment of the present invention.

FIG. 6 is a flow diagram of a method showing the activities that may be involved in starting up an add-on extension application in an add-on extension manager, in accordance with an embodiment of the present invention. In FIG. 6, a flow diagram 700 of a method for starting an add-on extension manager may include processing (705) a command line parameter to determine the instance of the Business Management Application to which to connect. In FIG. 6, the parameter may be a connection string and by using the connection string, add-on extension manager 212 may request a pointer to a business management application COM object from business management application UI Server 230. The add-on extension manager may determine (710) whether a first instance has been written into shared memory so that the first instance may either be created or opened to be used for posting the connection string from subsequent instances to the first one. In general, the first instance may only be created, if it is determined (710) that this is to be the first instance of the add-on extension manager. When instances of the add-on extension manager are being created, two event objects (reading-done and writing-done) may take care of synchronization of the shared memory block. The first instance of the add-on extension manager may wait for a writing-done event, which may be signaled when a new instance is written into shared memory. Before a next instance may write into shared memory, it may wait for the first instance to signal the reading-done event. Signaling of the reading-done event confirms that it is ready for handling the new connection. Shared memory may also determine which of the add-on extension managers started will be the first instance. The add-on extension manager that succeeds in creating the named shared memory block may be declared as the first instance.

In FIG. 6, a handle to a business management application UI Server process handle may be obtained (715) to monitor when the execution of the process should end. The first instance of the add-on extension manager may run as long as the business management application UI Server is running. The method may also include creating (720) one or more read/write shared memory events as not being signaled. The method may also create (725) an instance of an add-on COM object and start one or more extensions and create (730) a new connection to the business management application for the first instance of the add-on extension manager. When creating a connection to the business management application, all extensions may also be instantiated at this time. This process is further described below in relation of FIG. 7. In FIG. 6, the method may further include signaling (735) that the shared memory read event has been completed. The method may still further include determining (740) whether the business management application UI Server process has finished or the write shared memory event signal is received. Any connections between the first instance of the add-on extension manager may be destroyed (745) and the method may terminate, if the business management application UI Server process was determined (740) to be finished. However, if the write memory event was determined (740) to be signaled, the shared memory buffer may be read (750) and the method may loop back and continue by starting (730) the next extension associated with the first instance of the add-on extension manager and continue as described above.

In FIG. 6, if it is determined (710) that the first instance of the add-on extension manager already exists, then all subsequent instances may wait (755) to receive a read shared memory event signal, write (760) the command line parameters into the shared memory, and signal (765) a shared memory write event occurred.

Figure 7:
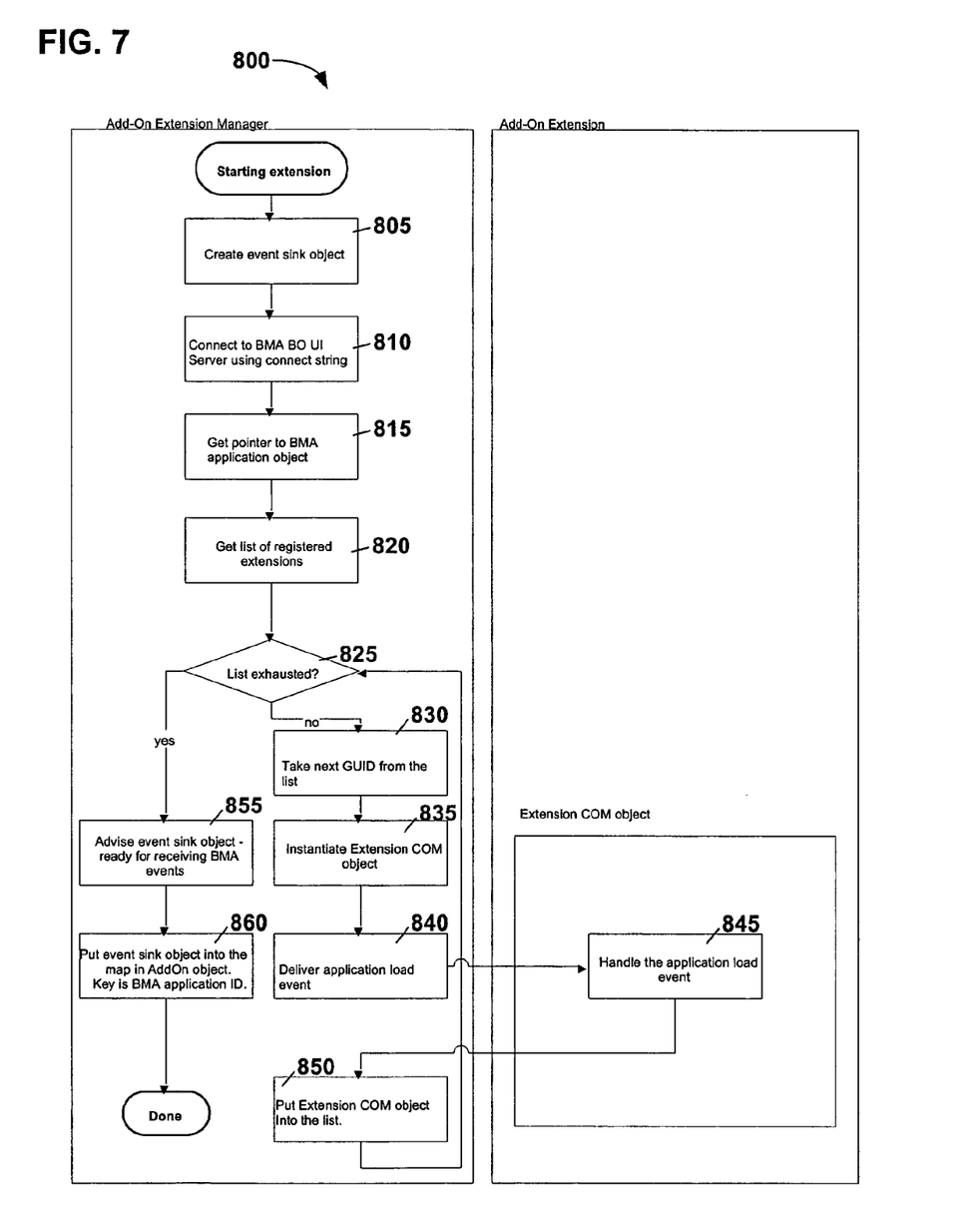
FIG. 7 is a flow diagram of a method for starting application extensions for use with a business management application, in accordance with an embodiment of the present invention.

FIG. 7 is a flow diagram of a method for starting application extensions for use with a business management application, in accordance with an embodiment of the present invention. In FIG. 7, the method may start-up an application extension by creating (805) an event sink COM object, for example, event sink COM object 521-1, in add-on extension manager 520 when a new instance of the business management application is started. The registered extensions may be stored in a registry as a list of GUIDs of add-on extension COM objects. In FIG. 7, the method may also include connecting (810) the event sink COM object to business management application UI server 510 using a connect string from the application extension and obtaining (815) a pointer to a business management application object, for example, business management application object 511-1. The method may also include obtaining (820) a list of available registered extensions from a business management software application and determining (825) whether there are any registered extensions left on the list. If at least one registered extension is determined (825) to be left on the list, the method may include reading (830) the next GUID from the list and instantiating (835) an add-on extension COM object, for example, add-on extension COM object 531, in add-on extension 530. Instantiating add-on extension COM objects may serve the purpose of delivering broadcast events (e.g., menu events, change language events, etc.) to the extensions. However, if the list of registered extensions is empty, no broadcast events may be delivered. The method may further include delivering (840) an application load event to add-on extension COM object 531, which may handle (845) the application load event. The method may further include adding (850) add-on extension COM object 531 to the list of registered extensions and looping back to determine (825) whether any more registered extensions are on the list and continuing as described above.

If it is determined (825) that there are no more registered extensions left on the list, the method may include notifying (855) the event sink COM object 521-1 to be ready to receive events from the business management application and adding (860) event sink COM object 521-1 to a map in add-on COM object 412 with the key being the business management application ID. The map may provide a list of add-on extension COM objects that should receive broadcast events.

In accordance with an embodiment of the present invention form creation is demonstrated in the following two examples. One example is to include using an eXtensible Markup Language ("XML") form definition first, and a second example is to include using UI API 230. The add-on framework may completely support creating forms using XML definitions and an XML form definition may be provided either as an external file included in the resources or as a string created directly in source code. Likewise, an XML form definition may be created either with an external form editor or manually with a text or XML editor. The add-on framework may also provide a mechanism for localization of the XML form definitions via string resources. If XML form definition does not support all of the functionality provided by UI API 230, some additional calls to UI API 230 may be needed after form creation (e.g., for initialization of the fields, etc.). The add-on framework may provide an easy way to add these additional calls.

In accordance with the present embodiment, after a form is created, for example, add-on form 641, it may be registered with add-on COM object 625 in add-on extension manager 520 to receive item events. The same may also be applicable for the standard forms in the business management application. Registration of the forms may be done automatically using provided class templates.

Further, in general, an extension may need some database tables to operate. These additional tables may be created as user tables. Similarly, there may also be a need to extend existing company tables with some user fields. The add-on framework may provide support for these operations. For example, the complete functionality may be described as including: creating a user table; creating user fields in the user table; creating user keys; loading data records into the user table; and extending standard tables with the user fields. Database definitions may be provided by the add-on extension in an XML file and the add-on framework may includes a class definition responsible for loading the file and performing database activities, as necessary.

The add-on extension may prepare the database at the beginning of its execution, i.e., when it is being loaded. This may involve checking the current state of the installation and to speed up the check, the framework may maintain versions of currently installed add-on extension tables and the state of the installation in one of its own database tables. A check function may compare the version of the extension with the stored one. When an extension is run for the first time there may be no tables. In this case the add-on extension may start the create procedure.

During initialization add-on extension manager 520 may display a kind of splash screen to show the progress of the various initialization steps. If an extension intends to display its own specific messages there, the extension may have to call an interface method associated with add-on COM object 625. Regardless, the database initialization progress may be displayed automatically. Add-on extension manager 520 may detect whether any database installation actions were performed on initialization. If installation actions did occur, the user may or may not need to restart the business management application to allow the database changes to take effect so that the add-on extensions can work properly in the running application.

Add-on extension manager 520, as well as every extension, may log messages using a central logging functionality. Add-on extension manager 520 may provide a COM interface as the logging function. In general, all messages may be written to one or more central log file(s) and the central logging function may be the only component that may access the log file(s) directly. All other components, for example, add-on extension manager 520 and add-on extension COM objects, may access the log via the COM interface. Add-on extension manager 520 may log the following events: start of a business management application instance; start of an add-on extension; receiving and dispatching events from UI API Server 510; and registration of forms. In addition each add-on extension may log individual messages.

In accordance with an embodiment, the add-on extension COM objects may need to both read data from and write data to the database. This may need to be done in a generalised way, unfortunately, since standard SQL is not able to fully provide all of the necessary capabilities, specific data retrieval and storing classes for each database may need to be created separately. However, using SQL statements within the business objects may not be safe due to SQL injection (discussed above). Therefore, to prevent SQL injection, the add-on extension COM objects and the persistency layer may be separated and the add-on extension COM objects may communicate with the persistency layer via a well-defined interface only. As a result, how and where the data may be stored is hidden from the add-on extension COM object. In general, the persistency layer may be generic in most aspects, with only a persistence interface object that may be specific for each add-on extension COM object. The persistence interface object may encapsulate the knowledge about the data structures and may be the only object in the persistency layer that may be directly used by each add-on extension COM object.

In general, the persistence interface object may be derived from a common class so that the application programmer doesn't need to know any SQL. The persistency layer may automatically create all necessary SQL statements from the requests received from the add-on extension COM objects. As in SQL, columns may be fetched from different tables in the same database and the persistency layer may support inner and outer joins. The persistency layer may also hide which database is being used from the add-on extension application. So we can switch to a different database system without modifying the add-on extension application. The generic class may provide the means to navigate through the records. If only one record within an application is needed, a second interface class may be provided by the persistency layer. This class may include the same data fetching and modification methods as the first interface class, with the exception of being able to browse through records.

In accordance with the present embodiment, for data transport a container class may be implemented to have member variables for all columns and at least the following two methods: a map to container method and a container to map method. The persistency layer may work with a map of fields so that the values may be transferred within the above methods from the map to the container variables or vice versa. These methods may be called automatically from the second interface class.

To use a persistence collection the add-on extension application may connect to the persistency layer and load the collection. The collection may be initialized using, for example, but not limited to, connect and load initialization methods, to offer several manipulation methods. The methods may include, for example: a first method to fetch the first record of the collection; a last method to fetch the last record of the collection; a next method to fetch the next record of the collection; a previous method to fetch the previous record of the collection; an eof method to test if the end of file was reached; a bof method to test if begin of file was reached; a getbykey method to fetch the record with the specified key from the collection; a find method to find a record in the collection by any column, as long as that column is part of the collection; an exists method to test if the record exists in the database a remove method to delete one record from the master table; a removerange method to delete a range of records from the master table; an add method to add a new record into the master table; an update method to update the master table; a refresh method to trigger a new select with the same query string that was used for load; and a getrecordcount method to return a count of selected records.

Figure 8:
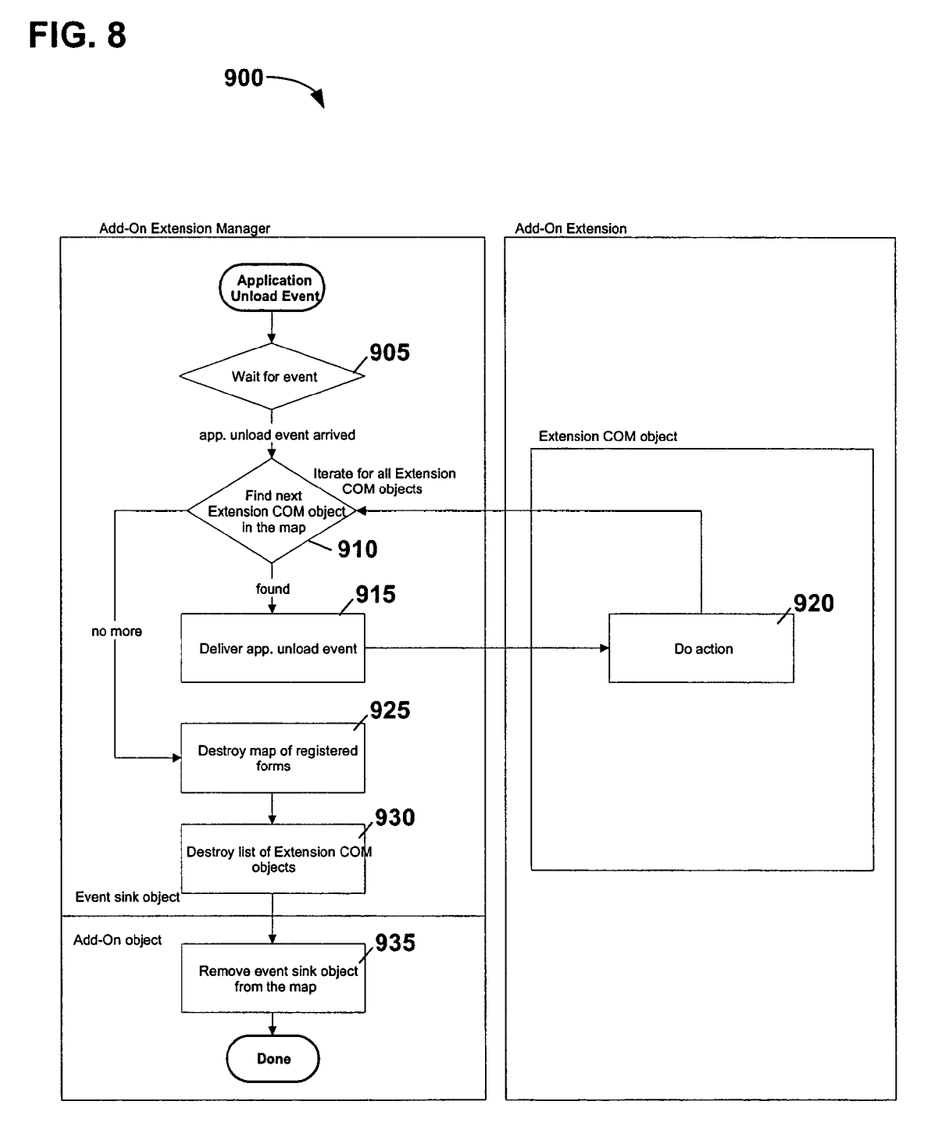
FIG. 8 is a flow diagram of a method for unloading a business management application from use in UI API server, in accordance with an embodiment of the present invention.

FIG. 8 is a flow diagram of a method for unloading a business management application from use in UI API server, in accordance with an embodiment of the present invention. In FIG. 8, the method may include determining (905) whether a business management application unload event has arrived and, if not, the method may loop back to repeat determining (905) whether a business management application unload event has arrived. If a business management application unload event is determined (905) to have arrived, the method may include determining (910) whether there is an add-on extension COM object associated with the business management application. If there is an add-on extension COM object associated with the business management application to be unloaded, the method may include delivering (915) the application unload event to the add-on extension COM object and the add-on extension COM object performing (920) the application unload event. The method may also include looping back to determine (910) whether there is another add-on extension COM object associated with the business management application and the method may continue as described above.

In FIG. 8, in accordance with the present embodiment, if the method determines (910) that no more add-on extensions COM objects associated with the business management application being deleted, the method may include destroying (925) the map of registered forms and destroying (930) the list of add-on extension COM objects in add-on extension manager 510. The method may further include removing (935) the event sink COM object from the map in add-on COM object.

Figure 9:
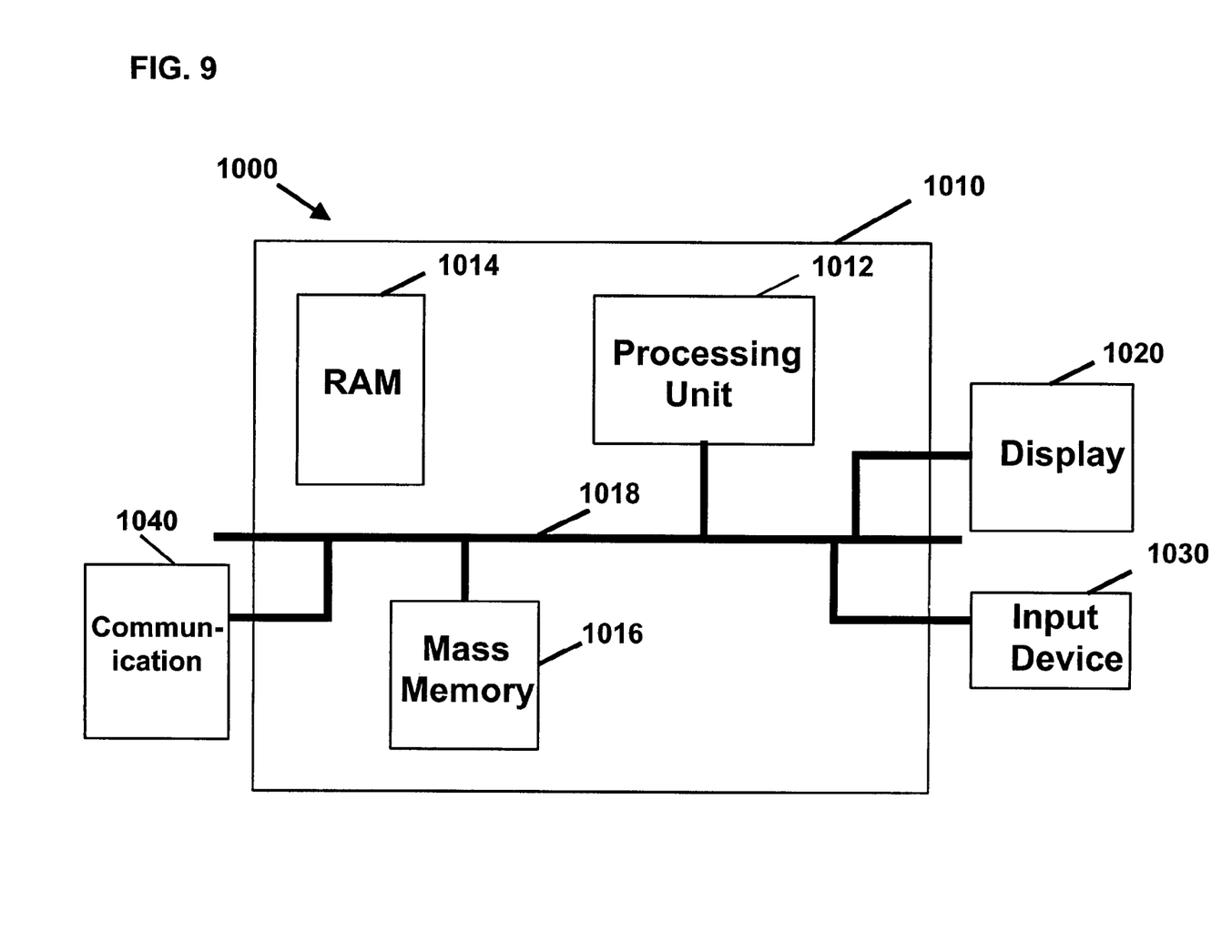
FIG. 9 is a block diagram of a client computer system for providing data exchange between applications having incompatible user interfaces and a database implemented to operate with a different user interface, in accordance with an embodiment of the present invention.

FIG. 9 is a block diagram of a client computer system for providing data exchange between applications having incompatible user interfaces and a database implemented to operate with a different user interface, in accordance with an embodiment of the present invention. In FIG. 9, a client computer system 1000 includes a processing component 1010 coupled to a display component 1020, an input component 1030 and a communication component 1040. Processing component 1010 may include a central processing unit 1012, a random access memory (RAM) 1014 and a mass memory system 1016 coupled together via a main system bus 1018. Mass memory system 1018 may include, for example, an operating system, a browser program, a database data access component and an application for accessing an incompatible database. In fact, in embodiments of the present invention, the operating system may include Microsoft® Windows® 98 second edition, Windows® 2000 sp1 or higher, Windows® XP® or Windows® NT® with sp5 or higher. The browser program may, for example, include Microsoft® Internet Explorer 5.5 or higher. The database data access component may, for example, include Microsoft® data access component v2.5 (mdac_typ.exe). The application accessing the incompatible database may, for example, include a DI API and a UI API to enable the direct registration of a user-defined object and/or a dll with a base class of objects and their related services in the application.

In FIG. 9, display component 1020 may be capable of displaying full color (e.g., 24-bit colors) and may include, for example, a standard CRT, a liquid crystal display, and a flat panel display. Input component 1030 may include, for example, a keyboard, a writing tablet, and a voice-to-text. Communication component 1040 may include, for example, a dial-up modem, a digital cable modem, a direct network connection, and a wireless modem.

Several embodiments of the present invention are specifically illustrated and described herein. However, it will be appreciated that modifications and variations of the present invention are covered by the above teachings and come within the purview of the appended claims without departing from the spirit and intended scope of the invention.

What is claimed is:

1. A system for providing access by an add-on application to a server-based application and database associated with the server-based application, comprising:

a processor configured with an event sink component object model object connected to an add-on component object model (COM) object, a business management application, and the add-on application, the processor configured to execute instructions:

provide a set of C++ programming language classes and interface definitions in a persistency layer of the software architecture;

develop a persistent business object in an add-on application using the set of C++ programming language classes and interface definitions;

connect the persistent business object to a database through a data interface application programming interface (DI API) and a user application programming interface (UI API) to read data from and write data to the database associated with the server-based application, execute the set of C++ programming language classes to implement the persistent business objects;

create a first database request based on a first request for data from the persistent business object by determining a type of the database containing the requested data, wherein the first database request is in a first format, and reformat the first request for data from the persistent business object as the first database request using a structured query language (SQL) based on the type of the database, wherein the first request for data from the persistent business object has a second format;

receive a response to the first database request in the second format through the data interface application programming interface (DI API) and the user application programming interface (UI API) at a generic interface;

generate a response to the data request in the first format from the response to the database request; and send the response to the data request in the first format to the add-on application, wherein the first format is a non-structured query language format and the second format is a structured query language format;

provide template classes enabling starting of the add-on application;

register a form from the add-on application; and route an event from the server-based application to the add-on application through the user interface application programming interface (UI API) and the data application programming interface (DI API), wherein the event is at least one of a start of business management application event, a stop of business management application event, a form creation event, a menu event, a business management application administration event, a read event, a write event, an administration event, an application load event or an application unload event.

2. The system of claim 1, further comprising:

an add-on extension manager executing by the processor to start the add-on application, register the form from the add-on application, and receive and route the event from the business management application to the add-on application through the user interface application programming interface (UI API) and the data application programming interface (DI API).

3. The system of claim 2, further comprising:
a log component executing by the processor to store messages from the add-on extension manager.

4. The system of claim 2 wherein the add-on extension manager interacts with the persistency layer of the software architecture.

5. The system of claim 1 wherein differences between the first format and the second format provide data security between the add-on application and the business management application.

* * * * *